UNITED STATES PATENT OFFICE.

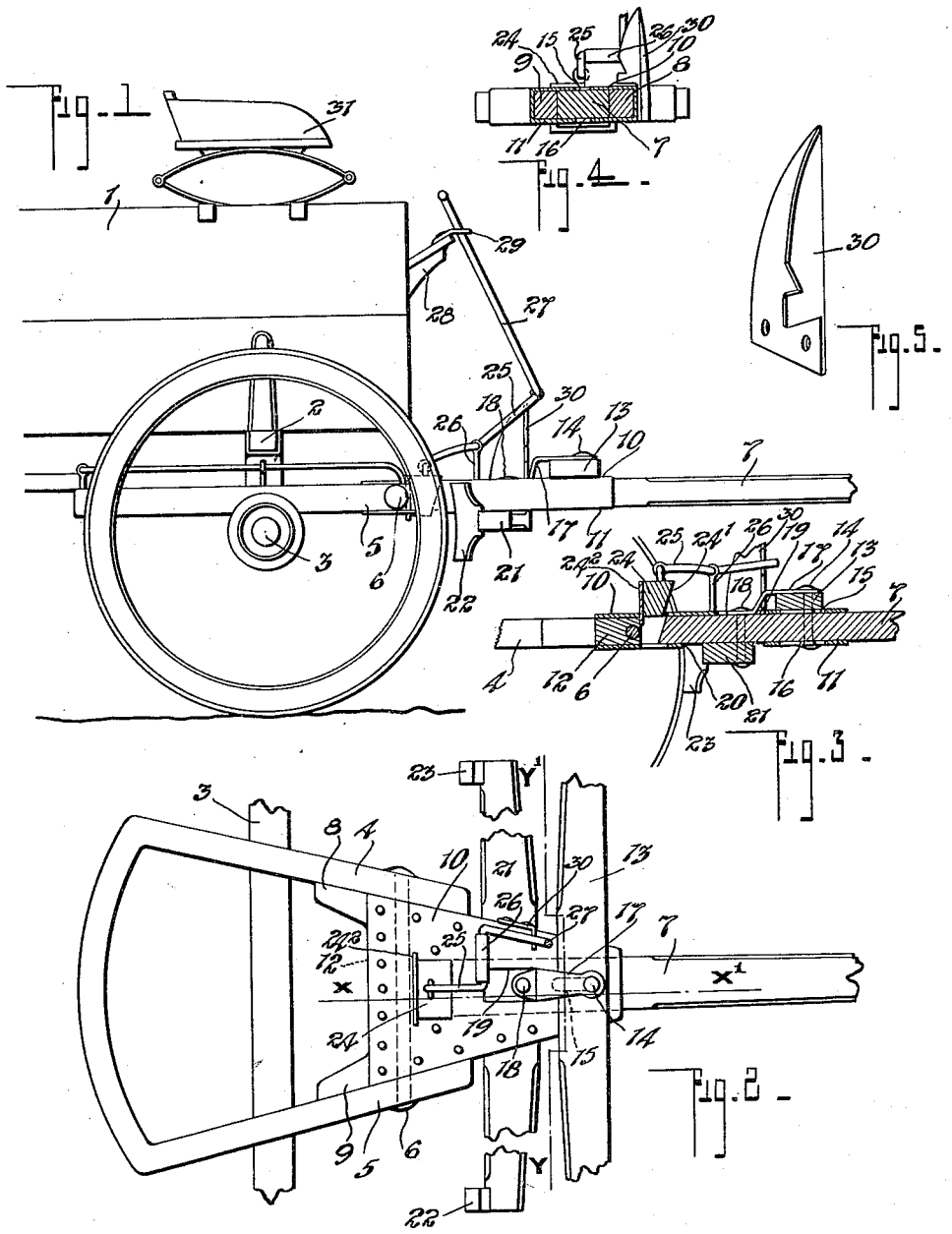

JONATHAN HOLLIDAY, OF TOGO, SASKATCHEWAN, CANADA.

BRAKE ATTACHMENT TO VEHICLES.

1,138,871.  Specification of Letters Patent.  Patented May 11, 1915.

Application filed April 6, 1914. Serial No. 830,031.

*To all whom it may concern:*

Be it known that I, JONATHAN HOLLIDAY, of the town of Togo, in the Province of Saskatchewan, Canada, have invented certain new and useful Improvements in Brake Attachments to Vehicles, of which the following is the specification.

The invention relates to improvements in brake attachments to vehicles and the object of the invention is to provide an inexpensive, easily attached and automatically operated brake attachment which will effectively retard the rotation of the front wheels of the vehicle when the same is put into use in descending an inclination.

With the above object in view the invention consists essentially in an endwise slidable pole connected to the vehicle, a brake beam secured to the pole and movable with the same, brake shoes secured to the beam and located in advance of the front wheels of the vehicle and releasable means normally holding the pole in the advanced position, the parts being arranged and constructed as hereinafter more particularly described and later pointed out in the appended claims.

Figure 1 represents a side view of the device as applied on a wagon. Fig. 2 represents a plan view of the attachment, the wagon box and other parts being removed to expose the front hounds. Fig. 3 represents a longitudinal sectional view through the device, the section being taken in the plane denoted by the line X—X' Fig. 2 and the tongue being shown in the back position. Fig. 4 represents a vertical cross sectional view through the attachment, the section being taken in the plane denoted by the line Y—Y' Fig. 2. Fig. 5 represents a perspective view of the spring plate.

In the drawing like characters of reference indicate corresponding parts in each figure.

1 represents the ordinary wagon box mounted on the bolster 2 in turn carried in the usual way on the front pivoted axle 3, the axle being supplied with the customary front, right and left hounds 4 and 5 which carry the queen bolt 6.

7 represents the usual wagon pole having the rear end thereof passing slidably between the pole hounds 8 and 9 and between the top and bottom metallic plates 10 and 11 permanently secured to the upper and lower faces of the pole hounds. The pole hounds are connected pivotally to the wagon hounds by the queen bolt already referred to, the queen bolt extending centrally through a cross piece 12 inserted between the extending ends of the former hounds.

13 is a double tree pivotally mounted on the upright bolt 14 secured to the pole and passing through longitudinally disposed slots 15 and 16 formed in the top and bottom plates.

17 is a hammer strap connected to the bolt and having the rear end secured permanently to the pole by a main bolt 18.

The top plate is cut away to provide a substantially rectangular slot 19 to receive and admit of the movement of the rear end of the hammer strap, while the bottom plate has a portion thereof entirely removed as shown at 20 to admit the brake beam 21 which is pivotally mounted on the lower or projecting end of the bolt 18. The brake beam extends crosswise of the pole and has the ends thereof located in advance of the vehicle wheels and fitted with brake shoes 22 and 23.

By the above arrangement it will be seen that the pole can be moved endwise between the top and bottom plates and in respect to the pole hounds and that in any such movement it will carry with it the brake beam and shoes with the result that when the pole is backed the shoes will engage with the wheel tires and brake them.

It will be understood that with the draft animals hitched to the wagon in the usual way, with the neck yoke fitted on the forward end of the pole and attached to the neck straps of the harness and the tugs connected to the double tree, the pole will be advanced the full limit as permitted by the slots 15 and 16, under the usual draft, while if the vehicle be going down an inclination and the animals held back, the pole will be withdrawn and the brake shoes will be accordingly automatically applied on the wheels.

In order that the tongue can be locked in its forward position and the brakes applied gradually I have supplied the parts now described.

24 represents a controlling block slidably mounted in the top and bottom plates and also in the pole hounds, which block has its forward face beveled or tapered as shown at 24' and its rear face fitted with a wearing plate 24² normally bearing against the cross piece 12.

The rear end of the pole is inclined in the same manner as the forward face of the block with the result that when the block is in its lower position the pole is locked against backward movement and when the block is gradually raised the pole is allowed to slide gradually back.

The movement of the block is controlled by a lever 25 pivotally carried by a standard 26 mounted on the top plate, the rear end of the lever being connected to the block while the forward end is fastened pivotally to a rod 27 passing upwardly in front of the foot rest 28 of the wagon box. The upper end of the rod is formed into a T-head so that it can be readily actuated by foot pressure. A strap 29 ties the rod to the foot rest.

30 is a spring plate secured permanently to the side of the pole hound 8 and having a suitable V-shaped notch in the side thereof arranged to receive the lever when the rod is depressed and hold the lever in the lower position, that is with the block withdrawn.

The above arrangement allows the driver to throw in or release the brakes while seated on the seat 31. By catching his toe underneath the T-head of the rod and drawing upwardly, the lever will be swung to pass the block to its lowest position, while by pressing down on the T-head of the rod the block will be gradually withdrawn to apply the brakes.

Although I have shown a particular means for controlling the block it will readily be understood that various other mechanical contrivances could readily be applied to equal advantage without departing in the least from the spirit of the invention.

What I claim as my invention is:—

1. In a wheeled vehicle the combination with the front hounds and the pole hounds pivotally connected to the front hounds, of top and bottom plates secured to the pole hounds, a pole slidably received between the plates and the pole hounds, a bolt passing through the pole and extending through suitable longitudinally disposed slots formed in the plates, the said slots and a bolt preventing the withdrawal of the pole from between the pole hounds, a double tree mounted on the bolt, a brake beam secured to the under side of the pole, brake shoes carried by the beam and located normally in advance of the front vehicle wheels and releasable means for locking the pole in its advanced position as limited by the slots, as and for the purpose specified.

2. In a wheeled vehicle the combination with the front hounds and the pole hounds pivotally connected to the front hounds, of top and bottom plates permanently secured to the pole hounds, a pole slidably received between the pole hounds, a vertically disposed bolt secured to the pole and extending through suitable longitudinally disposed slots provided in the plates, the slots limiting the end movement of the pole, a double tree mounted on the bolt, a brake beam secured to the under side of the pole, brake shoes secured to the ends of the beam and located normally in advance of the front vehicle wheels, a cross piece connecting the rear ends of the pole hounds and a removable block inserted between the rear end of the pole and the cross piece, said block normally retaining the pole in its advanced position as limited by the slots, as and for the purpose specified.

3. In a wheeled vehicle the combination with the front hounds and the pole hounds pivotally connected to the front hounds, of top and bottom plates permanently secured to the pole hounds, a pole slidably received between the pole hounds, a vertically disposed bolt secured to the pole and extending through suitable longitudinally disposed slots provided in the plates, the slots limiting the end movement of the pole, a double tree mounted on the bolt, a brake beam pivotally secured to the under side of the pole, brake shoes secured to the ends of the beam and located normally in advance of the front vehicle wheels, a cross piece connecting the rear end of the pole hounds, a vertically slidable wedge shaped block carried by the pole hounds and inserted between the cross piece and the rear end of the pole and means for withdrawing the block, as and for the purpose specified.

Signed at Togo this 2nd day of March 1914.

JONATHAN HOLLIDAY.

In the presence of—
R. F. PAINTER,
GEORGE CRAIG.

Copies of this patent may be obtained for five cents each, by addressing the "Commissioner of Patents, Washington, D. C."